United States Patent
Freeman et al.

(10) Patent No.: US 7,490,999 B2
(45) Date of Patent: Feb. 17, 2009

(54) HERMETIC AND NEAR HERMETIC SEALING OF OPTICAL COMPONENTS

(75) Inventors: William Freeman, Castro Valley, CA (US); Ming Shi, Pleasanton, CA (US); Hongjin Jiang, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 61 days.

(21) Appl. No.: 10/916,678

(22) Filed: Aug. 11, 2004

(65) Prior Publication Data

US 2005/0036748 A1  Feb. 17, 2005

Related U.S. Application Data

(60) Provisional application No. 60/494,634, filed on Aug. 11, 2003.

(51) Int. Cl.
 *G02B 6/36* (2006.01)
(52) U.S. Cl. ......................... 385/92; 385/94
(58) Field of Classification Search .................. 385/94, 385/92
 See application file for complete search history.

(56) References Cited

U.S. PATENT DOCUMENTS

| | | | | |
|---|---|---|---|---|
| 5,846,638 A | * | 12/1998 | Meissner | 428/220 |
| 6,764,228 B2 | * | 7/2004 | Moran | 385/94 |
| 6,826,319 B2 | * | 11/2004 | Lee | 385/11 |
| 6,974,266 B2 | * | 12/2005 | Seguin et al. | 385/94 |
| 7,035,484 B2 | * | 4/2006 | Silberberg et al. | 385/1 |
| 2002/0197025 A1 | * | 12/2002 | Vaganov et al. | 385/92 |
| 2003/0147603 A1 | * | 8/2003 | Moran | 385/94 |
| 2005/0037141 A1 | | 2/2005 | Shi et al. | |

\* cited by examiner

*Primary Examiner*—Frank G Font
*Assistant Examiner*—Mary A El Shammaa
(74) *Attorney, Agent, or Firm*—Workman Nydegger

(57) ABSTRACT

Methods and structures for reducing the moisture penetration in an optical device such as an isolator, collimator, filters, circulators, and the like. Methods can include placing an optical cover over the opening(s) of the housing of the optical device. The optical cover can be bonded by epoxy or metallic seal. A moisture prevention coating can be placed over the seal line between the optical cover and the housing to further enhance moisture prevention.

20 Claims, 4 Drawing Sheets

HERMETIC AND NEAR HERMETIC SEALING OF OPTICAL COMPONENTS

CROSS-REFERENCE TO RELATED APPLICATIONS

This application claims the benefit of U.S. Provisional Patent Application Ser. No. 60/494,634, filed Aug. 11, 2003 and entitled "Hermetic and Near Hermetic Sealing of Optical Components," which application is herein incorporated by reference in its entirety.

BACKGROUND OF THE INVENTION

1. The Field of the Invention

This invention relates generally to optical devices, including, but not limited to, optical collimators, optical filters, optical circulators, optical isolators, and other optical devices. The invention more particularly relates to hermetic and near hermetic seals in optical devices.

2. The Relevant Technology

Optical networking and telecommunication is increasingly employed as a method by which information can be reliably transmitted via a communications network. Networks employing optical networking and telecommunication technology are known as optical communications networks, and are marked by high bandwidth and reliable, high-speed data transmission. During recent years, the discrete optical components or devices in such networks have become less expensive and are capable of being used with networks having increasing date transmission rates. In addition, optical networks are employed in a variety of conditions and environments, some of which tend to damage or interfere with the operation of the optical devices in the network.

Moisture penetration is one of the principal problems affecting optical device applications, particularly in an uncontrolled environment. Moisture can penetrate through non-hermetically sealed devices. This harmful moisture can affect the performance of optical devices in many ways, as will be discussed in further detail below.

One way moisture can adversely affect the performance of optical devices is by increasing optical loss due to absorption of the optical light by moisture, in the form of water vapor, in the optical path. For optical devices working in wavelengths where moisture molecules have strong absorptions, the problem of increased optical loss is magnified.

In addition, moisture adversely affects optical device performance by increasing insertion loss by reducing the optical coupling. Increased insertion loss occurs in at least two ways. First, moisture, in the form of liquid water, may condense on the optical surface of the optical device. The presence of the moisture on the optical surface deflects or scatters the initial light trajectory, and as a result, light cannot be effectively coupled into the receiving port. In addition, increased insertion loss occurs when an optical surface, such as a filter, is attached to another optical component, such as a collimator, by epoxy. In this case the moisture molecules can penetrate the epoxy seal, thereby creating volume expansion and eventually leading to optical misalignment.

In the manufacture of optical devices, components are most often sealed with epoxy. As discussed above, however, water molecules can enter the optical device through the epoxy, resulting in several problems, such as those illustrated above. The epoxy sealing can only slow, and not prevent, the moisture penetration.

BRIEF SUMMARY OF THE INVENTION

The present invention provides methods and strictures for forming a hermetic or near hermetic seal in an optical device. Exemplary optical devices include, but are not limited to isolators, collimators, filters, circulators, and the like. In one embodiment, the hermetic or near hermetic seal prevents or reduces moisture penetration and condensation in optical devices by reducing the moisture penetration rate into the optical device.

In one embodiment, an optical device includes a housing having at least one opening. An optical cover is placed over the opening(s) in the housing. The optical cover can comprise an inorganic material such as glass or quartz. In one embodiment, at least one optical cover can include an optical element such as, but not limited to, a polarizer or a quarter wave plate. The optical cover may also be transparent to the wavelengths of interest. The housing includes an optical element disposed therein which provides the function which identifies the optical device as an isolator, collimator, filter, circulator, and the like. For example, the optical element could include a pair of polarizers separated by a glass spacer to form an isolator.

The housing can be hermetically sealed or near-hermetically sealed by placing an inorganic metallic layer over a bonding seal in the optical device. For example, the optical cover and housing can be bonded by an epoxy seal, metallic seal, or other bonding seal. These bonding seals can create a point in the optical device susceptible to potential moisture penetration. Thus, a moisture penetration coating may be provided over the bonding seal. In one embodiment, the edges of the optical cover can be angled to increase the thickness of the moisture penetration coating on the bonding seal.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention is related to sealing methods can produce a hermetically sealed or near-hermetically sealed optical device. One function of the hermetic or near hermetic seal is to significantly reduce the moisture penetration rate into an optical device and can hermetically seal the optical device. In some embodiments, the sealing methods can also (1) increase the usable lifespan of optical devices to more than twice that of optical devices not incorporating the present technology, (2) increase the lifespan of the optical device indefinitely, and/or (3) improve the overall performance of the optical devices. In addition, it will be appreciated that a hermetic or near-hermetic seal can eliminate penetration into the optical device of other harmful substances which may adversely effect the operation and/or life span of the optical device. Insertion loss attributable to moisture penetration may also be reduced, for example.

Figure 1:
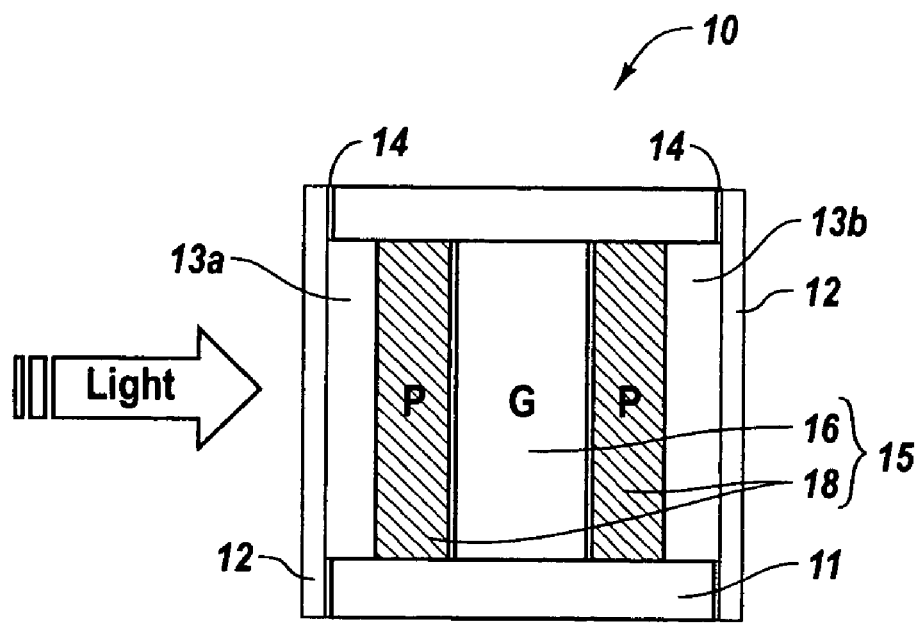
FIG. 1 illustrates an exemplary optical device having a moisture prevention seal, illustrating the moisture prevention seal comprises epoxy bonded glass windows.

With reference to FIG. 1, an isolator 10 is illustrated as an exemplary optical device and is used by way of explanation. However, it will be appreciated that other optical devices may fall within the scope of this invention including, but not limited to collimators, filters, circulators, and the like. Isolator 10 includes a housing 11 having two opposing openings 13a and 13b. Housing 11 includes an optical element 15 comprising a glass spacer 16 disposed between a pair of polarizers 18. It will be appreciated that the optical element 15 will differ depending on the particular optical device.

As shown in FIG. 1, the housing 11 includes an optical cover 12 covering each opening 13a, 13b. The optical covers 12 are preferably an optically clear material. In one embodiment, the optical cover 12 can be bonded over openings 13a, 13b to the housing 11 by an epoxy seal 14. Epoxy seals 14 are exemplary of the types of bonding seal materials that can be used to bond optical covers 12 to housing 11, but are not limiting to the present invention. However it will be appreciated that other materials may be used to bond the components of optical devices 10 together such as, but not limited to, organic polymers (such as epoxy), inorganic polymers (such as glass frit), hybrid polymers (such as sol-gels or siloxanes), metal or metal alloys, or ceramic.

During assembly, points by various bonding seal interfaces in the optical device 10 can be susceptible to moisture penetration. For example, the epoxy seal 14 of FIG. 1 forms one such point. These points susceptible to moisture penetration can begin on an exterior of the optical device 10 and can extend into the interior of the optical device 10. As discussed above, bonding seals can be formed by various materials, some being more susceptible to moisture penetration than others. Thus, it is possible that even very moisture resistant material (e.g., metal seals) in some cases, can also provide another point of potential moisture penetration.

Figure 2:
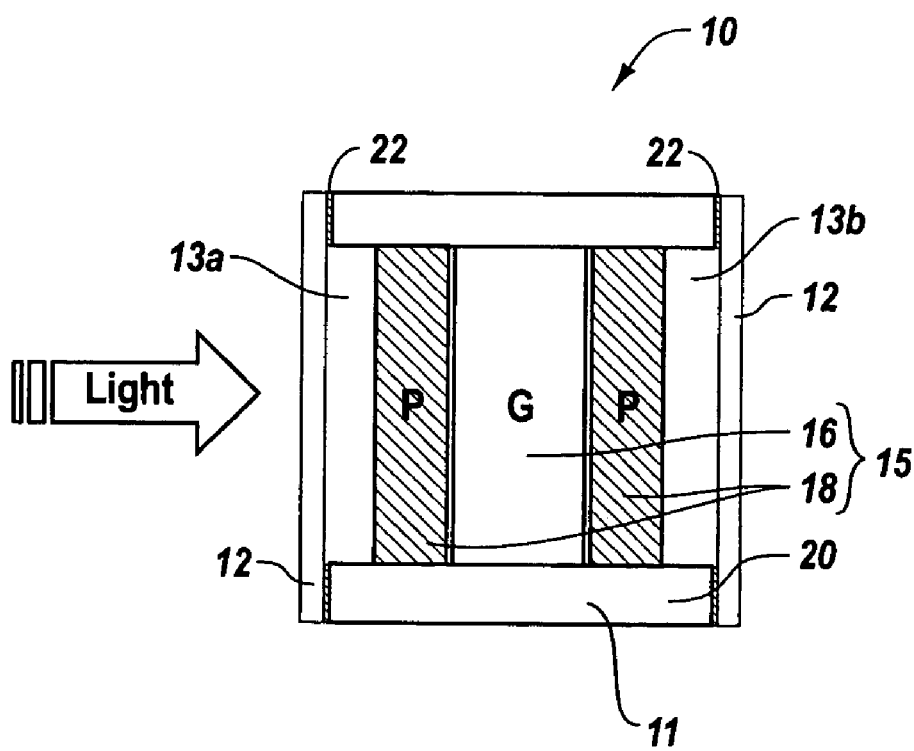
FIG. 2 illustrates another embodiment of an optical device having a moisture prevention seal comprising an isolator with reflowed metal seals.

FIG. 2 shows another embodiment of a magneto-optic isolator 10. In this embodiment, the optical covers 12 are bonded to the housing 11 of the isolator 10 using metal seals 22. The optical covers 12 are sealed to the housing 11 of the isolator 10 by soldering or brazing the optical covers to the housing. Isolator 10 includes a garnet wafer 16 disposed therein. In this embodiment, the housing of the isolator 10 is formed from a magnetic material, hereinafter referred to using numeral 20. Housing 11 being formed of magnetic material 20 is desirable in this embodiment because the garnet crystal 16 in the isolator 10 requires a permanent magnetic field of at least a few hundred Gauss to rotate the plane of polarized light. This is generally accomplished by using a hollow magnetic housing 11, within which is placed the garnet crystal(s) 16. The magnetic field does not affect the polarizers 18. The magnetic material 20 is generally impervious to water.

Figure 3:
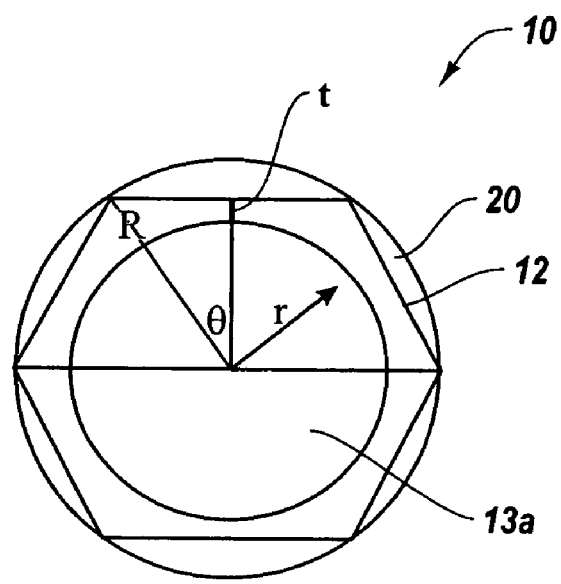
FIG. 3 illustrates a polygonal optical element attached to the housing of the optical device, showing the minimum bond line thickness on the outer edge of the optical cover.

Various processes may be used to form optical covers 12 that are suitable for the shape of the housing 11. As shown in FIG. 3, in one embodiment, the cross section of the housing 11 is generally round, although it may be other suitable shapes, as will be appreciated by those of skill in the art. The optical covers 12 is generally shaped to easily adhere to and cover the opening 13a or 13b of the housing. In one embodiment, the optical covers 12 are polygonal or octagonal in shape. Those of skill in the art will appreciated that optical covers 12 may have any suitable shape such as circular, oval, and the like.

Figure 4:
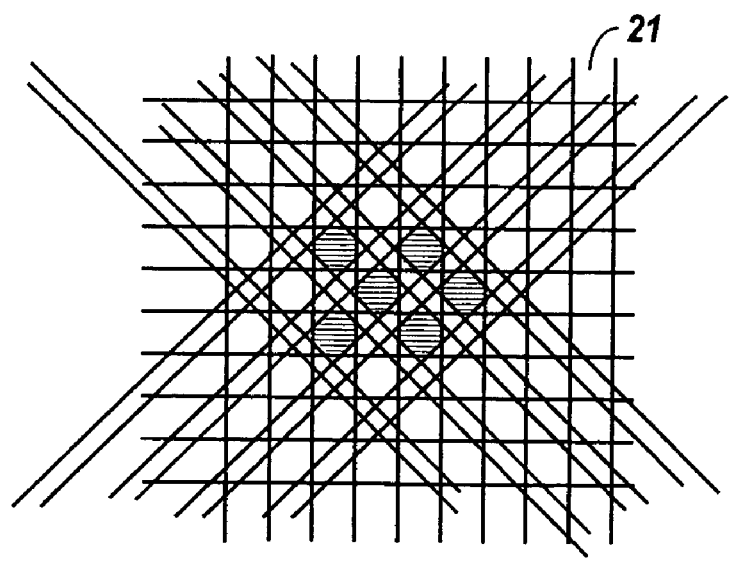
FIG. 4 illustrates a dicing pattern for obtaining hexagonal or octagonal optical covers.

Shaping the optical covers can be accomplished using a dicing method as illustrated in FIG. 4. A dicer, such as a gang saw, can be used to cut a sheet of optical material into the illustrated pattern in as few as four passes. The dicing method requires two different saw stacks, one for the diagonal direction and one for the vertical and horizontal directions. A dicing method is economical so long as inexpensive optical material is used so that the material wasted is of little consequence. Another method of forming optical covers 12 is laser cutting or mechanical coring. In some cases, these methods can be simpler and faster than dicing.

As shown in FIG. 3, when the optical material is cut, the minimum bond-line thickness t for adhesion to the housing 11 is defined by R*cos (360/2s)−r, where s is the number of sides of the polygon, R is the outside diameter of the housing 11, and r is the inside diameter of the housing 11.

Continuing with the process of forming metallized seals, after the optical covers 12 have been formed, the optical covers 12 are metallized. One method for metallizing optical cover 12 is by using a LIFT process. The LIFT process includes laying down a thin base layer and then laser ablating the material. One advantage of laser ablation is that it does not require the expensive and time consuming vacuum processing required for most PVD processes. In addition, the laser ablation process can be used in the forward and backward direction, with the first layer of metallization usually using backward ablation, thus shining the laser through the substrate onto the target. Subsequent layers must be metallized by forward ablation. However, it will be appreciated that other methods may be used to metallize covers 12. For example, thick layers can be plated by standard plating techniques or by laser directed plating. Seed layers can be deposited by laser deposition such as, but not limited to, PVD, CVD, PLD, and the like. In addition, to enhance adhesion between the optical cover 12 and the housing 11, a metallization layer can be deposited on the housing around openings 13a and/or 13b.

After metallization of the optical cover 12 and/or housing 11, the optical cover is bonded to the housing. This can be done by laser soldering or brazing. If the melting point of the solder is low enough, the optical cover 12 can be reflowed to the housing 11. One advantage of the laser reflow technique is that the heating is very localized and therefore does not disturb the integrity of the PGP optics in the isolator 10.

Figure 5:
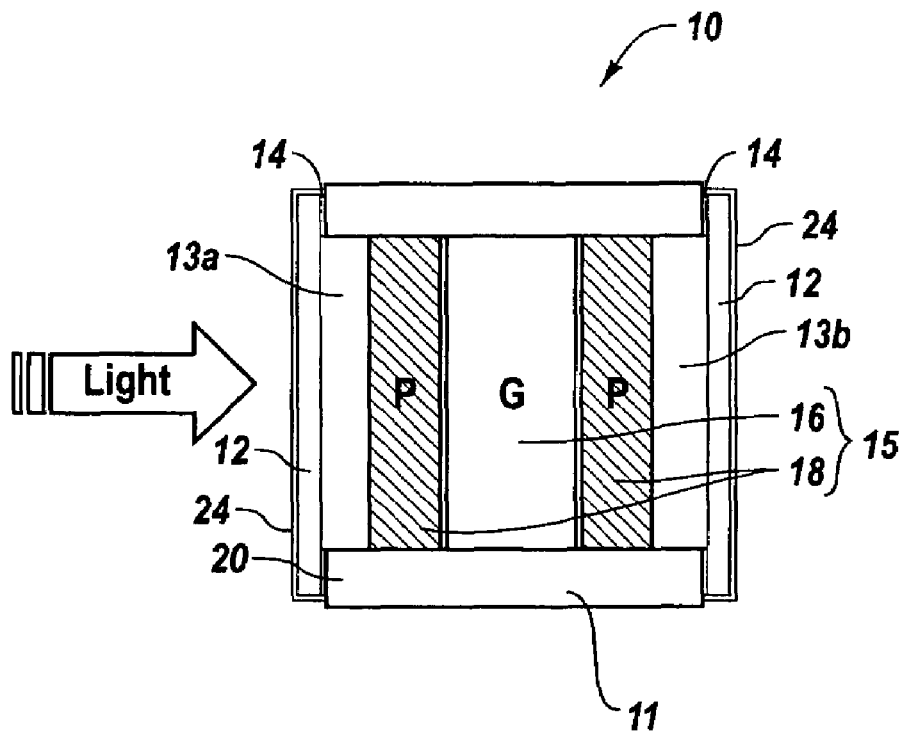
FIG. 5 illustrates an optical device with epoxy seals and a moisture-prevention coating.
Figure 6:
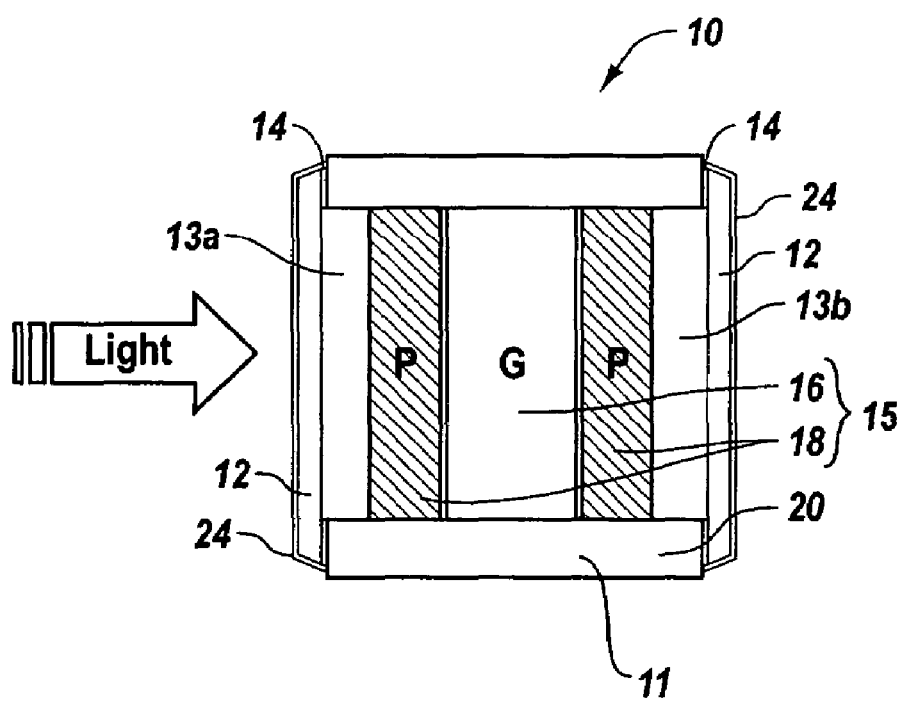
FIG. 6 illustrates the optical device of FIG. 5 with the edges of the optical cover cut at an angle.

FIGS. 5 and 6 illustrate that a moisture prevention coating 24 can be applied to the bonding seals of the optical devices 10 illustrated above. In this embodiment, the moisture prevention coating comprises a metal oxide that acts as an additional reinforcement to prevent moisture from penetrating the bonding seal between the optical cover 12 and the housing 11. The moisture prevention coating may also act as an anti-reflective surface in addition to its moisture prevention function. A thickness of the metal oxide coat of a mere hundred nanometers can increase the moisture resistance of polymers by a factor of more than 100.

The moisture penetration rate of a material is related to its affinity toward moisture molecules. Generally, inorganic materials, such as glass, quartz, and other suitable materials, are more resistive to moisture penetration than organic materials. One explanation for this is that organic materials are composed of large molecules compared to the smaller molecules of inorganic materials. The smaller molecular configurations of inorganic materials are more tightly packed or densely arranged than those of organic materials. This increased density of inorganic molecules makes it more difficult for water to penetrate the material. In contrast, organic materials have a high affinity to water molecules. In some cases, an inorganic material can have a moisture penetration rate of 100 times less than an organic material.

One method of applying a moisture prevention coating 24 comprises the following steps. First, the optical cover 12 is bonded to the housing 11 by an epoxy seal 14 or metallized seal 22. Next, a moisture prevention coating 24 is placed over the bonding seal between the optical cover 12 and the housing 11 to hermetically seal the interface thereof. The coating 24 may cover a substantial portion of optical cover 12 or may cover only a portion thereof. Preferably, the coating 24 has a suitable thickness so as to enhance the moisture prevention quality of the bonding seal. For example, a coating 24 comprising a metal oxide and having a thickness of 10 nm can improve the moisture prevention in an epoxy seal 14 by a factor of approximately 100. The thickness of a moisture prevention coating 24 having a two layer coat is typically around 300 nm. For a wideband coat, the thickness of the moisture prevention coating 24 is approximately 1 μm. As shown in FIG. 6, the edges of the optical cover 12 can be cut at an angle to provide an adequate thickness of coating 24 on the optical cover and to cover the bond line between the optical cover and the housing 11.

Figure 7:
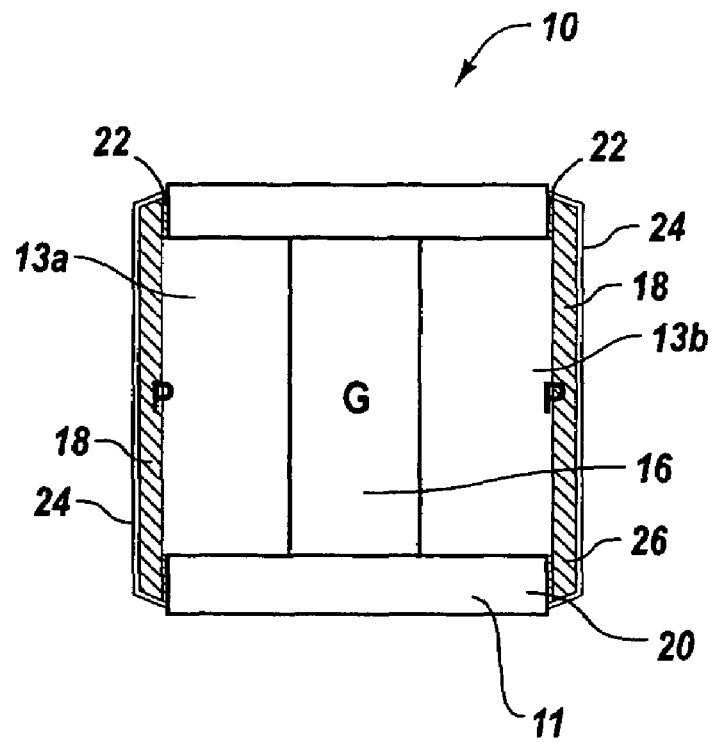
FIG. 7 illustrates an optical device with polarizers as the optical covers.

FIG. 7 illustrates yet another embodiment for sealing an isolator 10 in which the polarizers 18 are used to provide both the function of polarizing and also sealing the housing 11. That is, polarizers 18 serve as the optical covers 12 and can be bonded to housing 11 using bonding means described herein such as, but not limited to, epoxy, or brazed or soldered metal seals. This embodiment results in an isolator 10 which is naturally epoxy free in the light path. Generally, the polarizer is slightly larger than a polarizer in the interior of the isolator, and thus uses more polarizer material. The polarizers 18 can be bonded to the housing 11 of the isolator 10 using, for example, metal seals 22.

Figure 8:
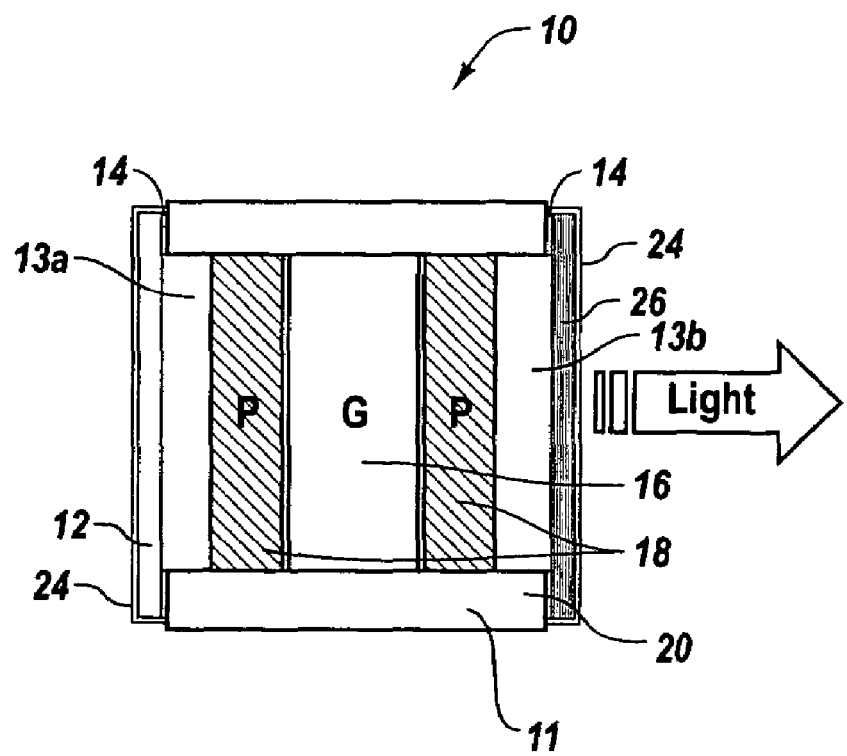
FIG. 8 illustrates an optical device with a quarter wave plate as one of the covers on the exit of the optical device.

Turning to FIG. 8, an embodiment of sealing an isolator 10 is illustrated using an optical cover 12 on the entrance 13a of the isolator and a quarter wave plate 26 on the exit 13b of the isolator. As used herein, the term "exit of the isolator" refers to the end of the isolator from which light exits. In this embodiment, the quarter wave plate acts as an optical cover in addition to other polarizing effects that it may have on exiting light. The quarter wave plate 26 located at the exit 13a of the isolator 10 can potentially add an isolation, up to the maximum isolation of the nearest polarizer, to the isolation of the isolator without the wave plate. In some cases, this can create an additional 40 dB of isolation depending upon the degree of racemization of the polarization of the reflections. In addition, a moisture prevention coating 24 can be deposited over the optical cover 12 and/or quarter wave plate 26. It will be appreciated that when using a coating 24, any of the optical covers (such as windows, polarizers, quarter wave plates) that serve to seal off the openings 13a, 13b of housing 11 may be cut at an angle to increase the thickness of the coating so as to ensure coverage of the bonding line between the optical cover and housing. Further, it will be appreciated that instead of epoxy sealing that a metallic sealing method may also be used.

In yet another embodiment, not shown, the prevention coating 24 can be applied before bonding the housing 11 with the covers 12. In other words, the bonding adhesive is placed on the housing 11 and/or cover 12. The prevention coating 24 is applied by methods discussed above (e.g., sputtering), and then the housing 11 and cover 12 are joined together.

The present invention can also be practiced in combination with the methods disclosed in U.S. Provisional Patent Application Ser. No. 60/494,633, filed Aug. 11, 2003, and entitled "Surface Passivation and Sealing of Micro-optics Devices for Improved Performance in Harsh Environments", incorporated herein by reference.

The present invention may be embodied in other specific forms without departing from its spirit or essential characteristics. The described embodiments are to be considered in all respects only as illustrative and not restrictive.

What is claimed is:

1. An hermetically or near hermetically sealed optical device comprising:
    a housing containing a first optical element and defining at least two opposing openings;
    an optical cover disposed over each of the two openings, wherein the first optical element is arranged between the optical covers, wherein each optical cover further comprises an optically clear material and the housing arranged to provide a light path through the optical covers and through the first optical element;
    a sealing bond formed between the housing and each optical cover such that a light path through the optical covers remains optically clear; and
    a coating of moisture prevention material substantially covering each sealing bond, wherein the first optical element is substantially hermetically sealed.

2. The optical device as recited in claim 1, wherein the sealing bond comprises an epoxy seal.

3. The optical device as recited in claim 1, wherein the sealing bond comprises a metallic seal.

4. The optical device as recited in claim 1, wherein the optical cover comprises at least one edge, wherein the at least one edge is angled.

5. The optical device as recited in claim 1, wherein the coating of moisture prevention material comprises an inorganic material.

6. The optical device as recited in claim 1, wherein the coating of moisture prevention material substantially covers the optical cover.

7. The optical device as recited in claim 1, wherein the coating of moisture prevention material partially covers the optical cover.

8. The optical device as recited in claim 1, wherein the coating of moisture prevention material acts as an antireflective coating.

9. The optical device as recited in claim 1, wherein the optical cover comprises a polygonal shape.

10. The optical device as recited in claim 1, wherein the optical cover comprises glass.

11. The optical device as recited in claim 1, wherein the optical cover comprises a polarizing material.

12. The optical device as recited in claim 1, wherein the optical cover comprises a quarter wave plate.

13. The optical device as recited in claim 1, wherein the housing comprises a magnetic material.

14. The optical device as recited in claim 9, wherein the optical element comprises a garnet wafer.

15. A method for forming a hermetic or near hermetic optical device, the method comprising:

placing a first optical element within a housing, the housing defining two opposing openings;

placing an optically clear optical cover over each opening to form a light path through the optically clear optical covers and the first optical element, the first optical element being arranged between the optically clear optical covers;

bonding each optical cover to the housing to form a bonding seal for each optical cover such that an optical path through the optically clear optical covers remains optically clear; and substantially covering each bonding seal between each optical cover and the housing with a moisture prevention coating.

16. The method as recited in claim 15, wherein bonding the optical cover to the housing comprises forming an epoxy seal between the optical cover and the housing.

17. The method as recited in claim 15, wherein bonding the optical cover to the housing comprises forming a metallic seal between the optical cover and the housing.

18. The method as recited in claim 17, wherein forming a metallic seal between the optical cover and the housing comprises metallizing at least one of the optical cover and the housing using laser ablating.

19. The method as recited in claim 15, wherein placing an optical cover over the at least one opening of the housing comprises angling at least one edge of the optical cover.

20. The method as recited in claim 15, wherein the optical cover comprises at least one of glass, a polarizer, and a quarter wave plate.

* * * * *

UNITED STATES PATENT AND TRADEMARK OFFICE
CERTIFICATE OF CORRECTION

PATENT NO. : 7,490,999 B2
APPLICATION NO. : 10/916678
DATED : February 17, 2009
INVENTOR(S) : Freeman et al.

It is certified that error appears in the above-identified patent and that said Letters Patent is hereby corrected as shown below:

Drawings
Sheet 2, replace Fig. 3 with the figure depicted below, wherein reference number --11-- has been inserted.

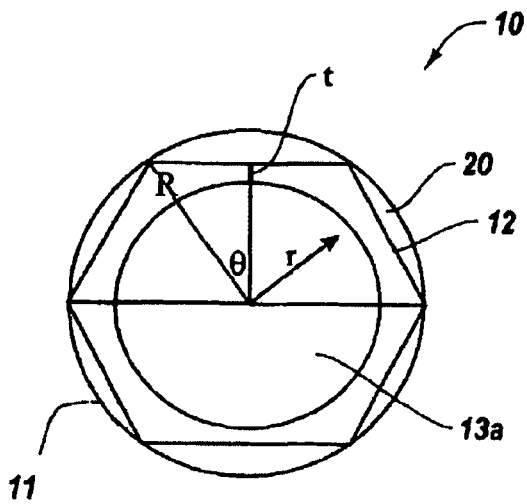

Fig. 3

Column 2
Line 3, change "strictures" to --structures--
Line 54, change "comprises" to --comprising--

Column 5
Line 24, change "22" to --22 (FIG. 2)--

Signed and Sealed this

Third Day of August, 2010

David J. Kappos
*Director of the United States Patent and Trademark Office*